US008856676B1

(12) United States Patent
Starenky et al.

(10) Patent No.: US 8,856,676 B1
(45) Date of Patent: Oct. 7, 2014

(54) PRE-FILLING INPUT FIELDS USING HEURISTIC DATA

(75) Inventors: Victor Starenky, Toronto (CA); Aleksandr Kennberg, Waterloo (CA)

(73) Assignee: Google Inc., Mountain View, CA (US)

( * ) Notice: Subject to any disclaimer, the term of this patent is extended or adjusted under 35 U.S.C. 154(b) by 68 days.

(21) Appl. No.: 13/250,976

(22) Filed: Sep. 30, 2011

Related U.S. Application Data (63) Continuation of application No. 13/168,916, filed on Jun. 24, 2011.

(51) Int. Cl.
*G06F 3/048* (2013.01)

(52) U.S. Cl.
USPC .......................................... 715/780

(58) Field of Classification Search
CPC .............................. G06F 3/0237; G06F 17/276
USPC ........................... 715/780, 764, 811, 221–226
See application file for complete search history.

(56) References Cited

U.S. PATENT DOCUMENTS

| | | | |
|---|---|---|---|
| 6,208,339 B1 | 3/2001 | Atlas et al. | |
| 6,564,213 B1 | 5/2003 | Ortega et al. | |
| 6,651,217 B1 * | 11/2003 | Kennedy et al. | 715/224 |
| 6,879,691 B1 | 4/2005 | Koretz | |
| 7,010,503 B1 * | 3/2006 | Oliver et al. | 705/4 |
| 7,216,292 B1 * | 5/2007 | Snapper et al. | 715/236 |
| 7,254,569 B2 | 8/2007 | Goodman et al. | |
| 7,500,201 B2 * | 3/2009 | Treibach-Heck et al. | 715/780 |
| 7,685,144 B1 | 3/2010 | Katragadda | |
| 2005/0192976 A1 * | 9/2005 | Klein | 707/100 |
| 2010/0162158 A1 * | 6/2010 | Dittmar et al. | 715/780 |
| 2011/0131524 A1 * | 6/2011 | Chang et al. | 715/780 |
| 2011/0302249 A1 * | 12/2011 | Orr et al. | 709/206 |

OTHER PUBLICATIONS

Firefox 4: HTML5 Forms, found at 1. http://hacks.mozilla.org/2010/11/firefox-4-html5-forms/, accessed Mar. 28, 2011, 11 pp.
U.S. Appl. No. 13/168,916, by Victor Starenky, filed Jun. 24, 2011.
Response to Office Action dated Feb. 1, 2013, from U.S. Appl. No. 13/168,916, filed May 1, 2013, 13 pp.
Non-Final Office Action from U.S. Appl. No. 13/168,916, dated Feb. 1, 2013, 20 pp.
Office Action from U.S. Appl. No. 13/168,916, dated Oct. 25, 2013, 21 pp.

* cited by examiner

*Primary Examiner* — Omar Abdul-Ali
*Assistant Examiner* — Phuong Nguyen
(74) *Attorney, Agent, or Firm* — Shumaker & Sieffert, P.A.

(57) ABSTRACT

In one example, a method receiving information indicating that an input field displayed at a presence-sensitive screen has been accessed, wherein the information comprises an input field identifier that identifies the input field. The method further includes selecting heuristic data based on the input field identifier, wherein one or more properties of the heuristic data are usable to generate at least a portion of an input value. The method further includes generating at least the portion of the input value based on the one or more properties of the heuristic data, wherein at least the portion of the input value is assignable to the input field displayed at the presence-sensitive screen.

21 Claims, 5 Drawing Sheets

PRE-FILLING INPUT FIELDS USING HEURISTIC DATA

This application is a continuation of U.S. application Ser. No. 13/168,916, filed Jun. 24, 2011, the entire content of which is incorporated herein by reference.

TECHNICAL FIELD

This disclosure relates to electronic devices and, more specifically, to graphical user interfaces of electronic devices.

BACKGROUND

A user may interact with applications executing on a mobile computing device (e.g., mobile phone, tablet computer, smart phone, or the like). For instance, a user may install, view, or delete an application on a computing device.

In some instances, a user may interact with the mobile device through a graphical user interface. For instance, a user may interact with a graphical user interface using a presence-sensitive display (e.g., touchscreen) of the mobile device.

SUMMARY

In one example, a method includes receiving information indicating that an input field displayed at a presence-sensitive screen has been accessed, wherein the information comprises an input field identifier that identifies the input field. The method further includes selecting, by a computing device, heuristic data based on the input field identifier, wherein one or more properties of the heuristic data are usable to generate at least a portion of an input value. The method further includes generating, by the computing device, at least the portion of the input value based on the one or more properties of the heuristic data, wherein at least the portion of the input value is assignable to the input field displayed at the presence-sensitive screen.

In one example, a computer-readable storage medium encoded with instructions that, when executed, cause one or more processors of a computing device to perform operations including receiving information indicating that an input field displayed at a presence-sensitive screen has been accessed, wherein the information comprises an input field identifier that identifies the input field. The computer-readable storage medium is further included with instructions that, when executed cause one or more processors the computing device to perform operations including selecting, by the computing device, heuristic data based on the input field identifier, wherein one or more properties of the heuristic data are usable to generate at least a portion of an input value. The computer-readable storage medium is further included with instructions that, when executed cause one or more processors the computing device to perform operations including generating, by the computing device, at least the portion of the input value based on the one or more properties of the heuristic data, wherein at least the portion of the input value is assignable to the input field displayed at the presence-sensitive screen.

In one example, a computing device includes one or more processors. The computing device also includes an output device to display an input field in a region of a graphical user interface. The computing device further includes a generation module executable by the one or more processors to a generation module executable by the one or more processors to: receive information indicating that an input field displayed at a presence-sensitive screen has been accessed, wherein the information comprises an input field identifier that identifies the input field; select heuristic data based on the input field identifier, wherein one or more properties of the heuristic data are usable to generate at least a portion of an input value; and generate at least the portion of the input value based on the one or more properties of the heuristic data, wherein at least the portion of the input value is assignable to the input field displayed at the presence-sensitive screen.

The details of one or more examples of this disclosure are set forth in the accompanying drawings and the description below. Other features, objects, and advantages of the disclosure will be apparent from the description and drawings, and from the claims.

DETAILED DESCRIPTION

In general, aspects of the present disclosure are directed to techniques for pre-filling input fields using heuristic data stored on a computing device, e.g., a smartphone. For instance, an application executing on the computing device may require a user to enter an input value in an input field, such as a text field. In some examples, user productivity may be improved by pre-filling a portion of the input value in the text field with data stored on the computing device. In some examples, however, the operating system of the computing device may deny applications access to various data on the computing device that include a portion of the input value for privacy and/or security reasons. Using techniques of the present disclosure, the application may pre-fill the text field using heuristic data stored on the computing device when actual portions of the input value may not be directly available.

In one example, an application may pre-fill a text field with an area code of the user's phone number in the text field using heuristic data. Although a user's phone number may be associated with the phone, security policies may deny some or all applications access to the actual phone number. Using techniques of the present disclosure, heuristic data may be used to generate a portion of the input value, e.g., area code. Heuristic data may include, e.g., phone numbers of an address book stored on the computing device. The application may identify a most frequently occurring area code of phone numbers stored the address book and determine that the user has the same area code as the most frequently occurring area code. For example, a user's address book may include many local contacts (e.g., contacts that may have the same area code as the user). The application may select the most frequently occurring area code as the user's area code and pre-fill the text field with the area code. Thus, techniques of the present disclosure may pre-fill input fields using heuristic data stored on a computing device, e.g., the number of occurrences of an area code.

Figure 1:
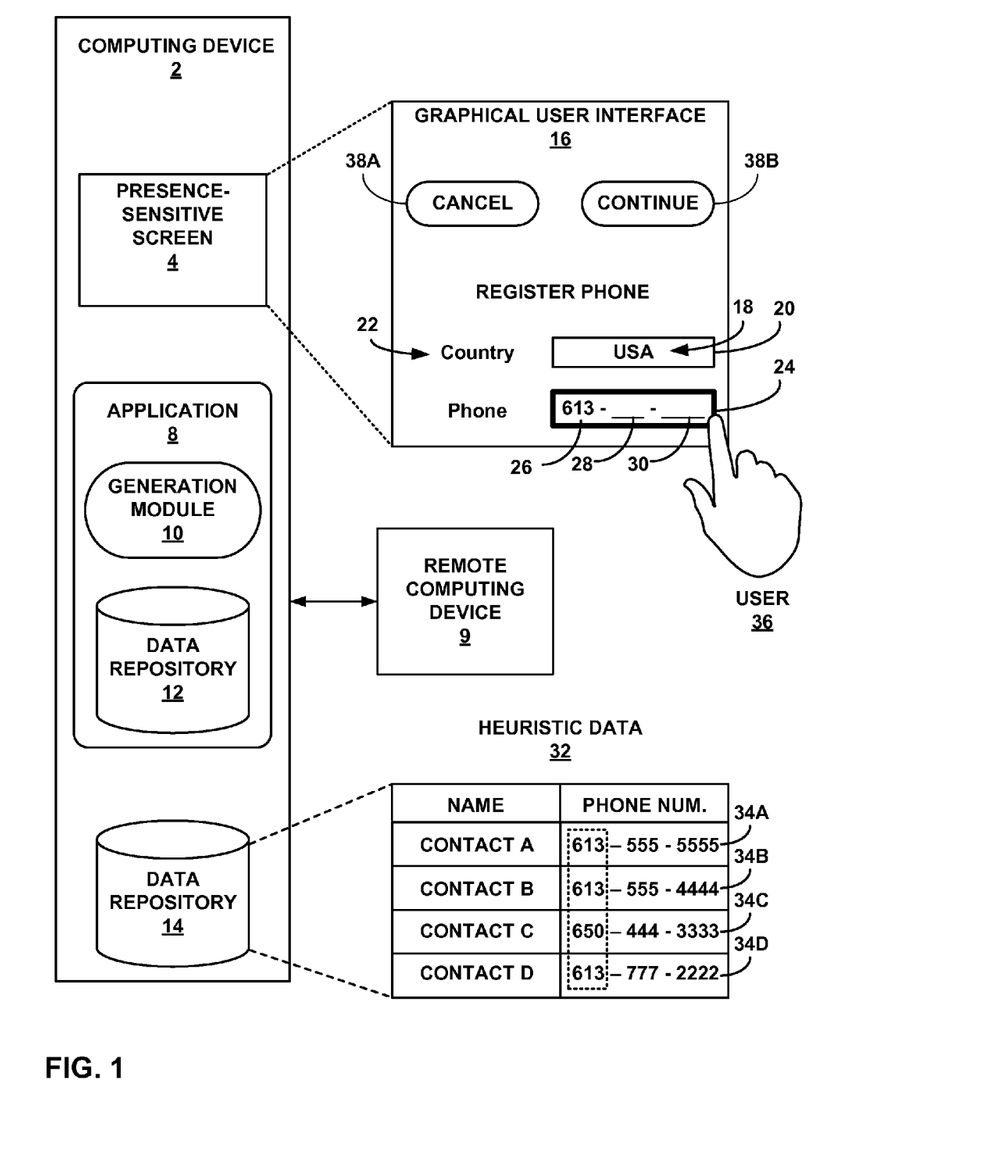
FIG. 1 is a block diagram illustrating an example of a computing device that may be configured to execute one or more applications.

FIG. 1 is a block diagram illustrating an example of a computing device 2 that may be configured to execute one or more applications, e.g., application 8, in accordance with one or more aspects of the present disclosure. As shown in FIG. 1, computing device 2 may include a presence-sensitive screen 4 and an application 8. Application 8 may, in some examples, include a generation module 10 and a data repository 12. In some examples, computing device 2 may further include a data repository 14.

Computing device 2, in some examples, is, includes, or is a part of a portable computing device (e.g. mobile phone, netbook, laptop, or tablet device) or a desktop computer. Computing device 2 may also connect to a wired or wireless network using a network interface (see, e.g., FIG. 2). One non-limiting example of computing device 2 is further described in the example of FIG. 2.

Computing device 2, in some examples, includes one or more input devices. In some examples, an input device may be the presence-sensitive screen 4. Presence-sensitive screen 4, in one example, generates one or more signals corresponding to a location selected by a gesture performed on or near the presence-sensitive screen 4. In some examples, presence-sensitive screen 4 detects a presence of an input unit, e.g., a finger that is in close proximity to, but does not physically touch, presence-sensitive screen 4. In other examples, the gesture may be a physical touch of presence-sensitive screen 4 to select the corresponding location, e.g., in the case of a touch-sensitive screen. Presence-sensitive screen 4, in some examples, generates a signal corresponding to the location of the input unit. Signals generated by the selection of the corresponding location are then provided as data to applications and other components of computing device 2.

In some examples, computing device 2 may include an input device such as a joystick, camera or other device capable of recognizing a gesture of a user 36. In one example, a camera capable of transmitting user input information to computing device 2 may visually identify a gesture performed by user 36. Upon visually identifying the gesture of user 36, a corresponding user input may be received by computing device 2 from the camera. The aforementioned examples of input devices are provided for purposes of illustration and other similar example techniques may also be suitable to detect a gesture and detected properties of a gesture.

In some examples, computing device 2 includes an output device, e.g., presence-sensitive screen 4. In some examples, presence-sensitive screen 4 may be programmed by computing device 2 to display graphical content. Graphical content, generally, includes any visual depiction displayed by presence-sensitive screen 4. Examples of graphical content may include images, text, videos, visual objects and/or visual program components such as scroll bars, text boxes, buttons, etc. In one example, application 8 may cause presence-sensitive screen 4 to display graphical user interface (GUI) 16.

As shown in FIG. 1, application 8 may execute on computing device 2. Application 8 may include program instructions and/or data that are executable by computing device 2. Examples of application 8 may include a web browser, an email application, a text messaging application or any other application that receives user input and/or outputs content, such as graphical content.

In some examples, application 8 causes GUI 16 to be displayed in presence-sensitive screen 4. GUI 16 may include interactive and/or non-interactive graphical content that presents information of computing device 2 in human-perceivable form. Graphical content may include control buttons 38A, 38B; label 22; input text 18, 26, 28, 30; and text fields 20, 24. In some examples GUI 16 enables user 36 to interact with application 8 through presence-sensitive screen 4. For example, user 36 may perform a gesture at a location of presence-sensitive screen 4 that displays control button 38A, e.g., user 36 may "select" control button 38A. In response to receiving the gesture, an operation associated with control button 38A may be executed by computing device 2. In this way, user 36 may create, modify, and/or delete data of computing device 2 via graphical content included in GUI 16.

In some examples, GUI 16 of application 8 may include one or more input fields such as input fields 20, 24. An input field may include any element of GUI 16 that may receive information from a user. Some examples of input fields include text box controls and free form drawing controls. Input fields enable a user to enter input values into a computing device. In some examples, an input value may include any information the user enters into an input field. For example, as shown in FIG. 1, input fields 20, 24 may be text box controls. User 36 may provide input values for input fields 20, 24 that may be received by application 8 for further processing.

In some examples, an input field may be identified by a label. For example, label 22 may identify input field 20. In this way, user 36 may enter an input value into an appropriate input field based on its corresponding label. For example, application 8 may request that user 36 enter a country name into input field 20. Label 22 may further be associated with input field 20 by, e.g., its arrangement in proximity to input field 20. Because label 22 indicates that input field 20 requires a country, user 36 may provide "USA" as input value 18. In some examples, an input value assigned to an input field may be displayed in the input field itself. For example, as shown in FIG. 1, input value 18 includes the text "USA" and is assigned to input field 20. Input value 18 is displayed in input field 20, in the current example, because input value 18 is assigned to input field 20.

As shown in FIG. 1, computing device 2 may further include one or more data repositories 12, 14. Data repositories may, in some examples, may be included in application 8, e.g., data repository 12. In other examples, application 8 may access other data repositories executing on computing device 2, e.g., data repository 14. In still other examples, application 8 may access data repositories executing on remote computing device 9 using a network interface. In some examples, data repositories may include lookup tables, maps, lists or other suitable data structures for storing and retrieving data. In other examples, data repositories may include Relational Database Management System (RDBMS) software. Examples of a data repository may include an address book, a recently called list, and a directory. Remote computing device 9 may in some examples include a server or other computing device connected to computing device 2.

In some examples, remote computing device 9 may further include an application with one or more modules similar or equivalent to application 8 and generation module 10, respectively. In such examples, remote computing device 9 may receive requests from computing device 2 to select heuristic data. In some examples, the request may include an input field identifier that identifies an input field. Remote computing device may select at least a portion of an input value from heuristic data based on the received input field identifier. The selected portion of the input value may be sent to computing device 2. In this way, remote computing device 9 may perform some or all of the functions that computing device 2 may perform.

As users interact with computing devices with greater frequency, users may rely on such devices to send and receive information in greater quantities. Consequently, users may provide larger amounts of information via graphical user interfaces such as GUI 16. Reducing the amount of time and effort required by a user to enter data into a computing device may improve the user experience and user productivity. Thus, an application that pre-fills information for the user may enable to the user to interact with a computing device more efficiently. In some examples, however, data required to pre-fill some or all of an input value may not be available duty to security or privacy policies. In such examples, techniques of the present disclosure may use heuristic data stored on computing device 2 to generate and pre-fill some or all of an input value.

As shown in FIG. 1, computing device 8 may include a generation module 10 that uses heuristic data stored on computing device 2 to generate and pre-fill some or all of an input value. For example, application 8 may cause presence-sensitive screen 4 to display GUI 16 that includes input fields 20, 24 to user 36. As shown in FIG. 1, GUI 16 may prompt a user to provide input values corresponding to a country and phone number. An input value may include multiple portions. For example, an input value such as a phone number may include three portions: a three digit area code, a three digit prefix, and a four digit line number. A portion of an input value may be any part of an input value. Thus, a portion of an input value may be any logical division of the input value into two or more parts. For instance, a portion of an input value may be one or more characters of an input value. A portion of an input value may in some examples include the complete input value. In some examples, a portion of an input value may be a suffix or a prefix of the input value. Although examples of the disclosure describe input values having different quantities of portions, techniques of the present disclosure are generally applicable input values comprising any quantities of portions.

Generation module 10 may determine, in some examples, that input field 24 is associated with a pre-fill operation in any number of ways. For example, generation module 10 may determine input field 24 is associated with a pre-fill operation when input field 24 is initially displayed. In other examples, generation module 10 may determine input field 24 is associated with a pre-fill operation when input field 24 is selected by user 36.

Generation module 10 may, in response to determining input field 24 is associated with a pre-fill operation, identify sources of heuristic data stored in one or more data repositories. For example, generation module 10 may store a list of identifiers, e.g., Uniform Resource Identifiers or pointers, identifying data repositories that store heuristic data. In some examples, sources of heuristic data, e.g., data repositories 12, 14, may be specified manually by user 36 or identified automatically by generation module 10.

In one example, generation module 10 may automatically identify an input field name of an input field. An input field name may describe a property or characteristic of an input field or input value that the input field may receive. In other examples, the input field name may identify the input field and may be referred to as an input field identifier.

An input field name may be associated with one or more data repositories. An association between an input field name and a data repository may specify a data repository with heuristic data usable to generate a portion of an input value for an input field of the associated input field name. An association may further specify a particular group or subset of heuristic data within a data repository that is associated with an input field name. In this way, generation module 10 may use such associations to select a specific subset of heuristic data from a data repository.

Associations between input field names and data repositories may be stored by generation module 10. In some examples, associations may be stored in external repositories that may be accessed by generation module 10. User 36 may in some cases define one or more associations. In other cases, a group of associations between input field names and data repositories may be defined in a document, by application 8, by another application, or other data repository. Such sources of associations may be stored on computing device 2 or other computing device connected to computing device 2 via a network interface or other communication device.

In one example, input field 24 may include an input field name "phone." Input field name "phone" may identify input field 24 as requiring a phone number input value. Generation module 10 may, in one example, determine that input field 24 includes input field name "phone." For example, in the case of a Hypertext Markup Language (HTML) document, an input field defined in the HTML language may include data that identifies input field 24 as having an input field name "phone." In an application, generation module 10 may identify input field 24 by a symbolic name. In any case, generation module 10, querying associations between input field names and data repository identifiers, may select one or more data repositories storing heuristic data that are associated with an input field having an input field name "phone." Generation module 10 may, in some examples, perform an exact match comparison or a partial match comparison of the input field name of, e.g., input field 24, and an input field name associated with a data repository. If generation module 10 identifies a partial or complete match of an input field name of, e.g., input field 24, and an input field name associated with a data repository, generation module 10 may determine that the identified data repository includes heuristic data usable for input field 24. In some examples, generation module 10 may perform a partial match search that queries a dictionary to identify an input field name. In any case, generation module 10 may select one or more data repositories after identifying the input field name. Heuristic data from the selected data repositories may be used by generation module 10 to generate a portion of the input value associated with input field 24.

Once generation module 10 has selected each data repository based on the input field name or other identifier, generation module 10 may select heuristic data from each data repository. Heuristic data may include any data usable to generate a portion of an input value that may be prefilled in an input field. In some examples, heuristic data may include one or more properties that generation module 10 may use to infer a portion of an input value. For example, generation module 10 may apply one or more statistical techniques to various properties of heuristic data in order to generate a portion of an input value. For example, an address book stored on computing device 2 may include multiple phone numbers. An inference may be generated by generation module 10 that a most frequently occurring area code of the phone numbers stored in the address book is a portion of an input value that user 36 may likely enter into an input field, e.g., an input field that requires a phone number as an input value.

As shown in FIG. 1, generation module 10 may select heuristic data 32 from data repository 14. Generation module 10, as described above, may use associations between input field names, data repositories, and groups of heuristic data within data repositories to select heuristic data usable to generate a portion of an input value that may be pre-filled in an input field 24. In the current example, generation module 10, may determine input field name "phone" is associated with input field 24. Generation module 10 may identify an association, using techniques described herein, that indicates data repository 14 stores heuristic data 32 usable to generate a portion of an input value that may be pre-filled in input field 24. The association may further specify one or more groups of heuristic data, e.g., phone numbers 34A-34D, that are usable to generate the portion of the input value. In the example of FIG. 1, data repository 14 may correspond to an address book.

In some examples, computing device 2 may select heuristic data from one or more remote computing devices. For example, generation module 10 may generate a request that identifies a remote data repository storing remote heuristic data on a remote device. The request may be addressed to the appropriate remote device using a data repository identifier. In some examples, the request may specify the heuristic data required by generation module 10. Generation module 10 may send the request to the remote computing device, which may in turn process the request to select remote heuristic data from a data repository stored on or connected to the remote device. Generation module 10 may receive the remote heuristic data in a message sent by the remote device.

Once generation module 10 has selected the groups of heuristic data usable to generate a portion of an input value, generation module 10 may process the heuristic data to generate the portion of the input value. For example, as shown in FIG. 1, generation module 10 may identify input field 24 as requesting an input value comprising a phone number based on the input field name associated with input field 24. Generation module 12 may select phone numbers 34A-34D from data repository 14 using various associations between the input field name "phone," data repository 14, and groups of heuristic data within data repository 14.

In some examples, generation module 10 may identify one or more settings that specify a quantity of data comprising the portion of the input value to be pre-filled in an input field. Such settings may be manually defined by user 36 or may be included in a document, data repository, application 8, other application, or other source of data. For example, as shown in FIG. 1, generation module 10 may select one or more settings that specify, for a given input field name, the quantity of data to be generated for a portion of an input value using the heuristic data. For example, a setting may indicate that, for an input field having an input field name "phone," generation module 10 generates the first three digits, e.g., the area code of a phone number, as the portion of the input value to be pre-filled in the input field.

Generation module 10 may further use settings that specify the quantity of data to select appropriate heuristic data for generating the portion of the input value. For example, when generation module 10 selects phone number 34A-34D from data repository 14 to generate area code 26 of input field 24, generation module 10 may determine based on one or more settings that only the first three digits will be generated as a portion of an input value to be pre-filled in input field 24. Consequently, when generation module 10 selects the heuristic data, generation module 10 may use the settings to identify which properties and/or parts of the heuristic data may be processed to generate the portion of the input value.

Once generation module 10 has determined the input field name, selected the corresponding heuristic data, and determined the quantity of data comprising the portion of the input value to be pre-filled in an input field, generation module 10 may process the heuristic data to generate the portion of the input value based on one or more properties of the heuristic data. As shown in FIG. 1, generation module 10 may determine that an area code comprises a portion of an input value that may be pre-filled in input field 24. Consequently, generation module 10 may select each phone number 34A-34D from data repository 14. Generation module 10 may further select the first three digits, e.g., the area code, of each phone number 34A-34D.

In some examples, generation module 10 may generate a statistic based on one or more properties of the heuristic data. A statistic may include a statistical value generated by applying a function to one or more properties of the heuristic data. For instance, generation module 10 may determine the number of occurrences of each area code in data repository 14. Thus, generation module 10 may apply a statistical mode function to the area codes to determine statistical mode. The statistical mode may be based on a property of the area codes, e.g., the value of each area code. For example, as shown in FIG. 1, phone numbers 34A, 34B, and 34D each include an area code having a value of "613." In some examples, generation module 10 may determine that area code "613" is a portion of an input value that may be pre-filled in input field 24. In other examples, generation module 10 may use other properties of heuristic data such as the length or type of values included in the heuristic data.

Although the current example uses a statistical mode to generate a portion of an input value based on properties of heuristic data 32, other techniques are also possible. For example, generation module 10 may calculate a statistical mean or median of the heuristic data. In other examples, generation module 10 may calculate a probability function to generate a portion of an input value.

In other examples, heuristic data may include a temporal property. For instance, date and/or time information may be associated with the heuristic data. In one example, a call log may include a group of telephone number called by computing device 2. Each entry in the call log may include a telephone number and an associated date. Consequently, entries in the call log may be ordered temporally. Generation module 10 may generate a portion of an input value based on a temporal trend of heuristic data. For example, generation module 10 may select one or more telephone numbers, e.g., values, from the call log. Generation module 10 may further select a group of recently called telephone numbers from the call log. A group of recently called telephone numbers may include telephone numbers called within a time period specified by user 36 or application 8. In some examples, generation module 10 may further determine a most frequently occurring area code of the telephone numbers in the group of recently called numbers. In some examples generation module 10 may determine that a portion of the input value for input field 24 includes the most frequently occurring area code of the recently called telephone numbers. In this way, if a value in the heuristic data has occurred more recently, generation module 10 may select the value to generate a portion of the input value.

Once generation module 10 has generated the portion of the input value, generation module 10 may assign the portion of the input value to the corresponding input field. For example, as shown in FIG. 1, generation module 10 may assign area code 26 to input field 24. In some examples, generation module 10 may cause presence-sensitive screen 4 to display area code 26 in input field 24 as shown in FIG. 1. Area code 26 may comprise a portion of a complete phone number, e.g., an input value. In some examples, area code 26 may not be generated responsive to a portion of the input value entered by a user. For example, when a user provides a user input that includes, e.g., digits representing a line number or prefix of telephone number, generation module 10 may not use the entered digits to select area code 26.

In some examples, area code 26 may be entered before user 36 inputs the remaining portion of the complete phone number. In some examples, generation module 10 may generate area code 26 without requiring user 36 to initially enter a second portion, e.g., prefix 28 or line number 24, of the telephone number. In this way, user 36 may not be required to enter input before presence-sensitive screen 4 pre-fills input field 24 with area code 26. Because user 36 may not be required to provide input before pre-filling input field 24, generation module 10 may reduce the amount of user input required to enter the entire phone number, e.g., input value, of input field 24. Moreover, such techniques may eliminate the need for user 36 to have knowledge of area code 26 prior to entering input values for prefix 28 and line number 30 of input field 24.

Techniques of the present disclosure may also accommodate security and privacy policies implemented on the computing device. For instance, using techniques of the present disclosure, access to secure or private information may not be required. Instead, application 8 may use accessible sources of heuristic data to generate the portion of the input value used to pre-fill an input field. For example, although a telephone number associated with a computing device may not be accessible for security and/or privacy reasons, techniques of the present disclosure may pre-fill a correct area code of the telephone number using other available sources of heuristic data.

Figure 2:
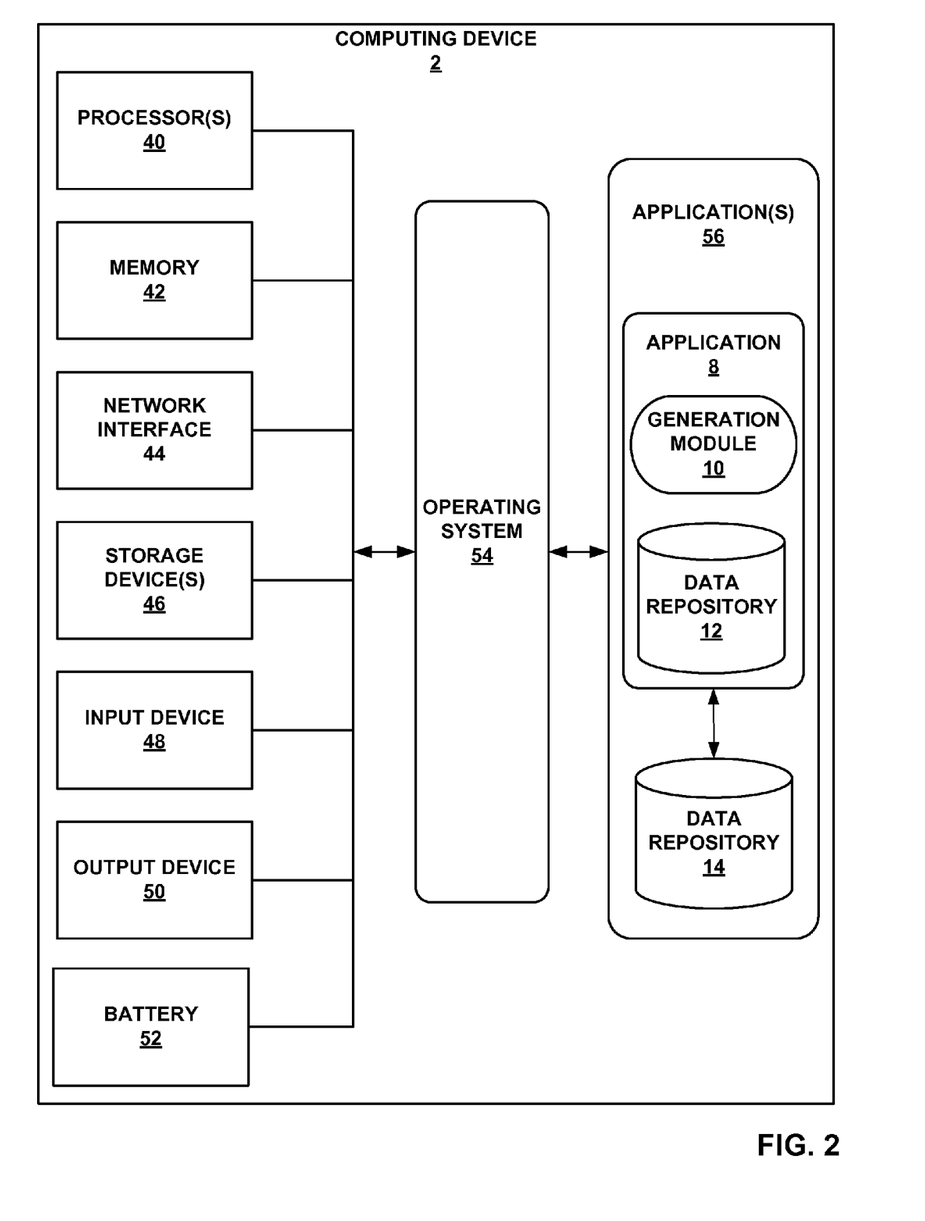
FIG. 2 is a block diagram illustrating further details of one example of the computing device shown in FIG. 1.

FIG. 2 is a block diagram illustrating further details of one example of computing device 2 shown in FIG. 1, in accordance with one or more aspects of the present disclosure. FIG. 2 illustrates only one particular example of computing device 2, and many other example embodiments of computing device 2 may be used in other instances.

As shown in the specific example of FIG. 2, computing device 2 includes one or more processors 40, memory 42, a network interface 44, one or more storage devices 46, input device 48, output device 50, and battery 52. Computing device 2 also includes an operating system 54. Computing device 2, in one example, further includes application 8 and one or more other applications 56. Application 8 and one or more other applications 56 are also executable by computing device 2. Each of components 40, 42, 44, 46, 48, 50, 52, 54, 56, and 8 may be interconnected (physically, communicatively, and/or operatively) for inter-component communications.

Processors 40, in one example, are configured to implement functionality and/or process instructions for execution within computing device 2. For example, processors 40 may be capable of processing instructions stored in memory 42 or instructions stored on storage devices 46.

Memory 42, in one example, is configured to store information within computing device 2 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computing device 2 is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 2 (e.g., application 8 and/or one or more other applications 56) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes a network interface 44. Computing device 2, in one example, utilizes network interface 44 to communicate with external devices via one or more networks, such as one or more wireless networks. Network interface 44 may be a network interface card, such as an Ethernet card, an optical transceiver, a radio frequency transceiver, or any other type of device that can send and receive information. Other examples of such network interfaces may include Bluetooth, 3G and WiFi radios in mobile computing devices as well as USB. In some examples, computing device 2 utilizes network interface 44 to wirelessly communicate with an external device (not shown) such as a server, mobile phone, or other networked computing device.

Computing device 2, in one example, also includes one or more input devices 48. Input device 48, in some examples, is configured to receive input from a user through tactile, audio, or video feedback. Examples of input device 48 include a presence-sensitive screen (e.g., presence-sensitive screen 4 shown in FIG. 1), a mouse, a keyboard, a voice responsive system, video camera, microphone or any other type of device for detecting a command from a user. In some examples, a presence-sensitive screen includes a touch-sensitive screen.

One or more output devices 50 may also be included in computing device 2. Output device 50, in some examples, is configured to provide output to a user using tactile, audio, or video stimuli. Output device 50, in one example, includes a presence-sensitive screen (e.g., presence-sensitive screen 4 shown in FIG. 1), sound card, a video graphics adapter card, or any other type of device for converting a signal into an appropriate form understandable to humans or machines. Additional examples of output device 50 include a speaker, a cathode ray tube (CRT) monitor, a liquid crystal display (LCD), or any other type of device that can generate intelligible output to a user.

Computing device 2, in some examples, include one or more batteries 52, which may be rechargeable and provide power to computing device 2. Battery 52, in some examples, is made from nickel-cadmium, lithium-ion, or other suitable material.

Computing device 2 may include operating system 54. Operating system 54, in some examples, controls the operation of components of computing device 2. For example, operating system 54, in one example, facilitates the interaction of application 8 with processors 40, memory 42, network interface 44, storage device 46, input device 48, output device 50, and battery 52.

As shown in FIG. 2, application 8 may include application 8 and generation module 10 as described in FIG. 1. Generation module 10 may include program instructions and/or data that are executable by computing device 2. For example, generation module 10 may include instructions that cause application 8 executing on computing device 2 to perform one or more of the operations and actions described in FIGS. 1-5.

Any applications, e.g., application 8 or other applications 56, implemented within or executed by computing device 2 may be implemented or contained within, operable by, executed by, and/or be operatively/communicatively coupled to components of computing device 2, e.g., processors 40, memory 42, network interface 44, storage devices 46, input device 48 and/or output device 50.

Figure 3:
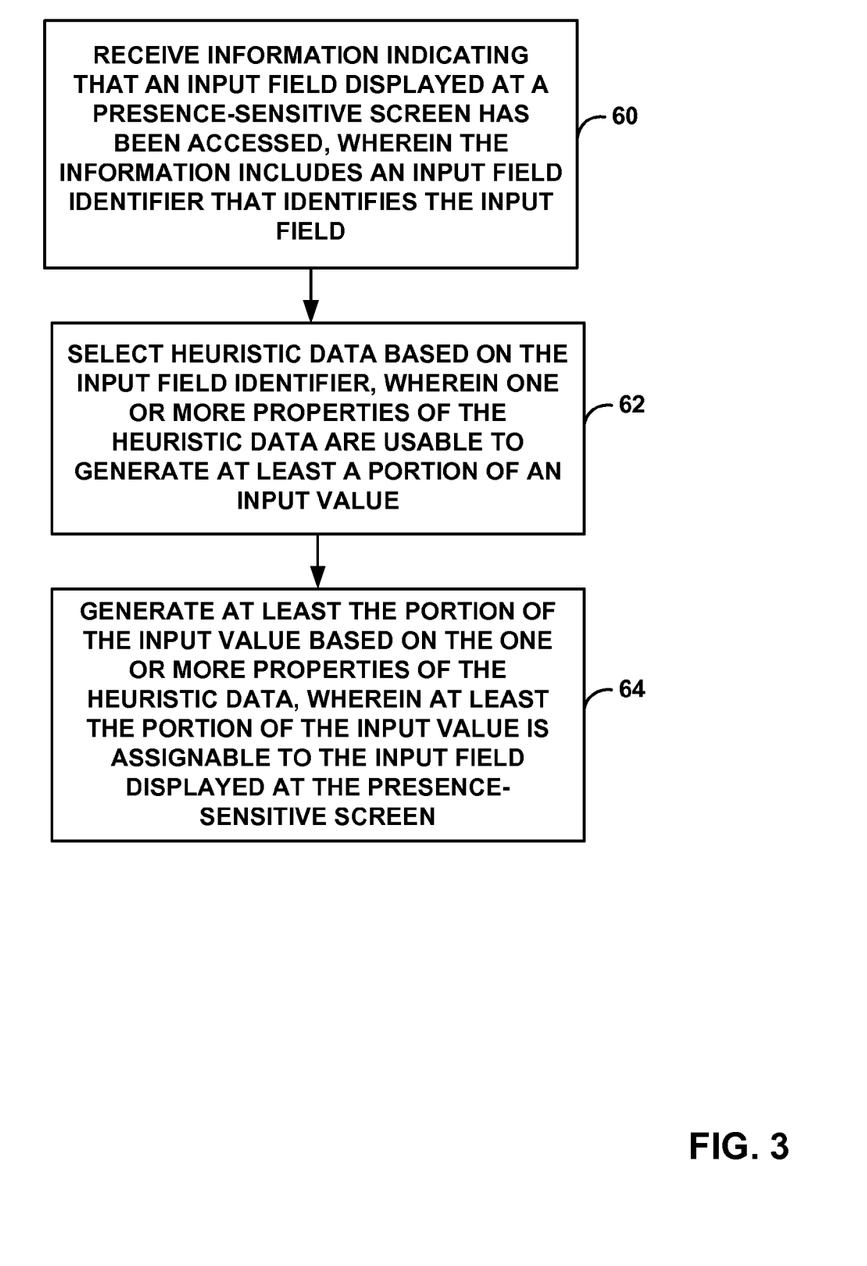
FIG. 3 is a flow diagram illustrating an example process that may be performed by a computing device to pre-fill input fields using heuristic data stored on a computing device.

FIG. 3 is a flow diagram illustrating an example process that may be performed by a computing device to pre-fill input fields using heuristic data stored on a computing device. For example, the process illustrated in FIG. 3 may be performed by computing device 2 shown in FIGS. 1 and/or 2. In other examples, the process illustrated in FIG. 3 may be performed by remote computing device 9 as shown in FIG. 1.

The process of FIG. 3 includes, receiving information indicating that an input field displayed at a presence-sensitive screen has been accessed, wherein the information comprises an input field identifier that identifies the input field (60). The process further includes selecting, by a computing device, heuristic data based on the input field identifier, wherein one or more properties of the heuristic data are usable to generate at least a portion of an input value (62). The process further includes, generating, by the computing device, at least the portion of the input value based on the one or more properties of the heuristic data, wherein at least the portion of the input value is assignable to the input field displayed at the presence-sensitive screen.

In some examples, the process includes displaying, at the presence-sensitive screen, the input field that is capable of receiving at least the portion of the input value. In other examples, at least the portion of the input value includes a first portion, and the input value further includes a second portion. In some examples, the process includes displaying, at the presence-sensitive screen, the input field; and assigning, by the computing device, the first portion of the input value to the input field for display before receiving the second portion of the input value in the input field. In some examples, the process includes, determining, by the computing device, an input field name is associated with the input field, wherein the input field name describes a characteristic of the input value receivable by the input field. The process may also include selecting, by the computing device, an association between the input field name and a data repository, wherein the association further indicates a subset of heuristic data associated with the input field name. The process may also include identifying, by the computing device, one or more data repositories storing the heuristic data based on the input field name, and selecting, by the computing device, the subset of the heuristic data from the data repositories.

In some examples, the process includes generating, by the computing device, a request that identifies a remote data repository storing remote heuristic data on a remote device. The process may also include sending, by the computing device, the request to the remote device; and receiving, by the computing device, the remote heuristic data. In some examples, generating the first portion of the input value based on the one or more properties of the heuristic data may further include generating, by the computing device, a statistic based on the one or more properties of the heuristic data. The process may also include determining, by the computing device, the first portion of the input value is based on the statistic.

In some examples, generating a statistic based on the one or more properties of the heuristic data may further include selecting, by the computing device, a most frequently occurring value of the one or more values of the heuristic data, wherein the most frequently occurring value includes a value with a highest number of occurrences among the one or more values. The process may also include determining, by the computing device, the first portion of the input value includes the most frequently occurring value.

In some examples, generating a statistic based on the one or more properties of the heuristic data may include selecting, by the computing device, a group of recent values of the one or more values of the heuristic data, wherein the group of recent values have occurred within a specified time interval. The process may also include determining, by the computing device, a most frequently occurring value of the group of recent values, wherein the most frequently occurring value includes a recent value with a highest number of occurrences among the group of recent values. The process may also include determining, by the computing device, the first portion of the input value includes the most frequently occurring value.

In some examples, the computing device stores the heuristic data in a data repository. In some examples, the data repository includes a call log, wherein the call log includes a group of telephone numbers called by the computing device. In some examples, the data repository may include a call log, wherein the call log comprises a group of telephone numbers received by the computing device. In some examples, the process may include receiving, by the computing device, geographic coordinates of the computing device, wherein the geographic coordinates indicate a geographic location of the computing device. The process may also include selecting, by the computing device, a subset of the heuristic data based on the geographic coordinates. The process may further include generating, by the computing device, the first portion of the input value based on the subset of the heuristic data.

In some examples, the process may include generating, by the computing device, a group of candidate portions of the input value based on the one or more properties of the heuristic data, wherein each candidate portion includes a value selectable by a user as the first portion of the input value. The process may further include displaying, by the computing device, the group of candidate portions of the input value. The process may also include receiving, by the computing device, selection data from a user that indicates a candidate portion has been selected. The process may further include determining, by the computing device, the selected candidate portion includes the first portion of the input value.

In some examples, the process may include displaying, by the computing device, the assigned first portion of the input value to the input field. In some examples, the first portion of the input value may not be generated responsive to the second portion of the input value entered by a user. In some examples, the first portion of the input value includes the complete input value. In some examples, the input value includes a telephone number or country name. In some examples, the first portion of the input value includes a prefix or a suffix of the input value.

Figure 4:
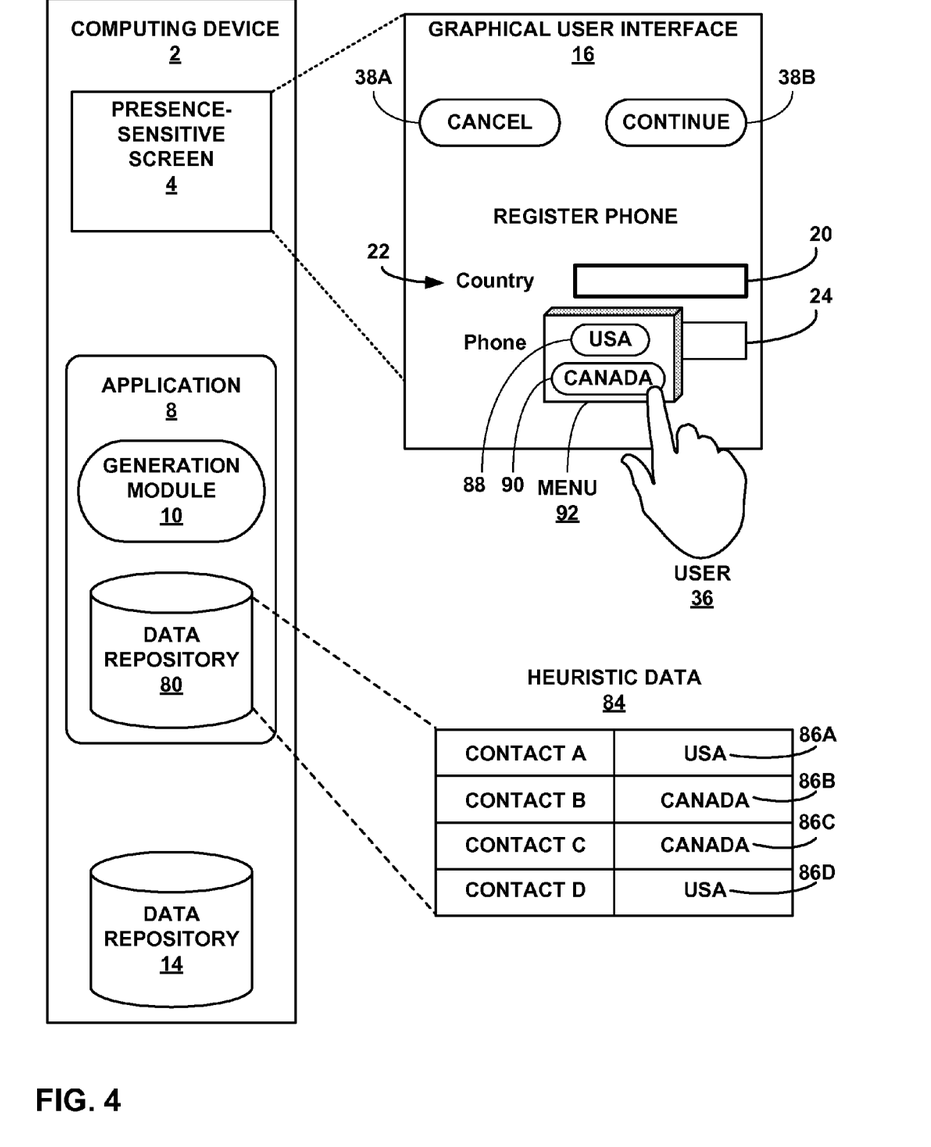
FIG. 4 is a block diagram illustrating an example application that may be configured to generate a group of candidate portions of an input value.

FIG. 4 is a block diagram illustrating an application 8 that may be configured to generate a group of candidate portions of an input value, in accordance with one or more aspects of the present disclosure. As shown in FIG. 4, computing device 2 and the various components included in FIG. 4 may include similar properties and characteristics as described in FIGS. 1 and 2 unless otherwise described hereinafter. Computing device 2 includes presence-sensitive screen 4, application 8, generation module 10, data repository 80, and data repository 14. In some examples, presence-sensitive screen 4 may display GUI 16 that further includes control buttons 38A, 38B; label 22; input fields 20, 24; menu 92; and control buttons 88, 90.

In various examples that implement techniques of the present disclosure, generation module 10 may generate a group of candidate portions of an input value based on one or more properties of heuristic data. In some examples, the group of candidate portions may be displayed to a user. For example, as shown in FIG. 1, menu 92 may include candidate portions 88 and 90 further discussed herein. In such examples, user 36 may select a candidate portion, which generation module 10 may determine is a portion of the input value. Such techniques may be useful to provide user 36 with multiple candidate portions when, for example, a function applied to heuristic data 84 may provide multiple options for the portion of the input value. For instance, a function may be a probability function. Each of the probabilities of candidate portions selected by generation module 10 may at least satisfy a likelihood threshold value. The likelihood threshold value may be specified by a user or generated by a computing device. If a probability of a heuristic data value occurring satisfies the likelihood threshold value, the heuristic data value may be selected as a candidate portion. In other examples, each of the probabilities of candidate portions selected by generation module 10 may be within a likelihood threshold range. The following example illustrates a use case that uses a statistical mode function.

In one example, as shown in FIG. 4, data repository 80 may include heuristic data 84. In the example of FIG. 4, application 8 may require user 36 to confirm his/her country code. Using techniques of the present disclosure, generation module 10 may select country codes 86A-86D stored in data repository 80. In the current example, data repository 80 may include an address book that further includes contact names of persons, addresses, phone numbers, and country codes 86A-86D. Generation module 10 may apply a statistical mode function to country codes 86A-86D to generate a portion of the input value for input field 20. When generation module 10 applies the statistical mode function to 86A-86D, generation module 10 may determine that that country codes "USA" and "CANADA" each occur twice in heuristic data 84. Consequently, the statistical mode may include two values: "USA" and "CANADA."

In the current example, when generation module 10 applies a function to heuristic data 84, multiple, possible options may be available as the portion of the input value for input field 20. When generation module 10 determines multiple, possible options are present, generation module 10 may generate a group of candidate portions. In the example of FIG. 4, candidate portions may include "USA" and "CANADA." Generation module 10 may generate a menu 92 that includes control buttons 88 and 90 corresponding to candidate portions "USA" and "CANADA," respectively. In some examples, generation module 10 may display menu 92 when user 36 selects input field 20. In other examples, generation module 10 may display menu 92 when GUI 16 initially displays menu 92. In any case, when user 36 selects, e.g., control button 90, the candidate portion "CANADA" may be assigned to input field 20.

In some examples, generation module 10 may assign a most frequently occurring candidate portion to input field 20. Additionally, generation module 10 may further display menu 92 that includes candidate portions 88, 90 that occur less frequently than the most frequently occurring candidate portion assigned to input field 20. In such examples, user 36 may select candidate portion 88 or 90, which in turn may be assigned to input field 20. In still other examples, if user 36 does not find any of the candidate portions acceptable, the user may provide an input value, e.g., enter text, of the portion the user wishes to assign to input field 20.

In other examples, user 36 and/or application 8 may provide generation module 10 with a setting that causes menu 92 to display a group of candidate portions irrespective of whether each candidate portion is equally likely to be selected by user 36. For example, user 36 may provide a setting to generation module 10 that indicates the three most probable candidate portions from heuristic data 84 will be displayed in menu 92. In such examples, although one candidate portion may be more probable than another, three candidate portions are displayed in menu 92. In some examples, the candidate portions may be ordered from a highest-probability candidate value to a lowest-probability candidate value in menu 92.

Figure 5:
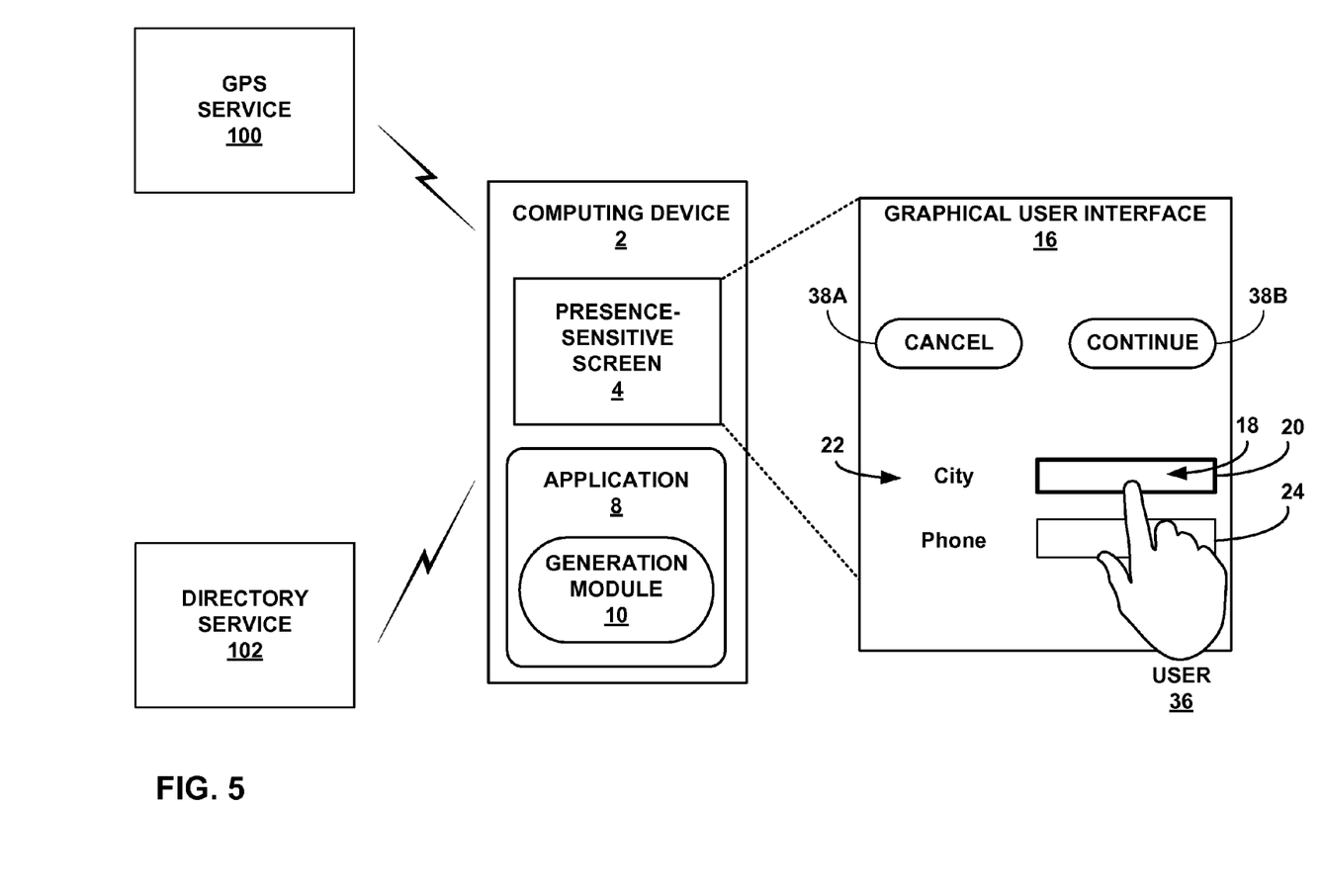
FIG. 5 is a block diagram illustrating an example application that may be configured to generate a portion of an input value using multiple sources of heuristic data.

FIG. 5 is a block diagram illustrating an application 8 that may be configured to generate a portion of an input value using multiple sources of heuristic data, in accordance with one or more aspects of the present disclosure. As shown in FIG. 5, computing device 2 and the various components included in FIG. 5 may include similar properties and characteristics as described in FIGS. 1 and 2 unless otherwise described hereinafter. Computing device 2 includes presence-sensitive screen 4, application 8, and generation module 10. In some examples, presence-sensitive screen 4 may display GUI 16 that further includes control buttons 38A, 38B; label 22; and input fields 20, 24.

In some examples, computing device 2 may include one or more network interfaces as shown in FIG. 2. Computing device 2 may communicate via one or more networks such as the Internet and or a Global Positioning System (GPS) network to send and receive data with other remote computing devices connected to the network. For example, in FIG. 1, computing device 2 may transmit information to and from GPS service 100 and directory service 102. GPS service 100 and directory service 102 may be two types of data repositories.

GPS service 100 may include an information service provided by a remote computing device that provides geographic location information. Geographical location information may include geographic coordinates specifying a location in a geographic coordinate system. For example, computing device 2 may generate a request for the geographic coordinates of computing device 2. Computing device 2 may send the request to GPS service 100 which may in turn provide the geographic coordinates to computing device 2. In this way, computing device 2 may determine its geographic location.

Directory service 102 may, in some examples, include an information service provided by a remote computing device that provides access to a directory. A directory may include one or more searchable entries. The entries may be searched based on attribute submitted in a request. In one example, a directory may include an address book with each entry corresponding to contact information a person, location, or other entity. In one example, computing device 2 may generate a request for contact information of a person using one or more attributes. Computing device 2 may send the request to directory service 102, which may in turn provide the contact information based on the attributes. In this way, computing device 2 may retrieve contact information using one or more attributes.

In some examples, computing device 2 may use multiple sources of heuristic data to generate a portion of an input value. For example, GUI 16 of computing device 2 may display a form of an HTML page to record a transaction. User 36 may in the current example work for an employer with branch offices in four different cities on a regular basis. The HTML page may require, among other things, that user 36 enter a city in which a particular transaction occurred. In one example, generation module 10, using techniques of the present disclosure, may send a request to directory service 102 for heuristic data usable to generate a city name for input field 20. Heuristic data may include contact entries for each branch location. In such examples, the heuristic data may indicate the probable input value of input field 20 is equally likely.

Computing device 2 may use multiple sources of heuristic data to improve the accuracy of the portion of the input value. For example, as shown in FIG. 5, generation module 10 may use heuristic data from directory service 102 as described and additionally GPS service 100. In the current example, computing device 2 may generate a request for geographic coordinates that represent the current location of computing device 2. GPS service 100 may in turn generate and send geographic location information indicating the current location of computing device 2. Generation module 10 may use the geographic location information to determine distances of computing device 2 to each of the four cities included in directory service 102. Using the geographic location, generation module 10 may select the city that is the shortest distance from computing device 2 from directory service 102. Generation module 10 may generate the portion of the input value, e.g., the city, name based on the selected city. By using multiple sources of heuristic data, generation module 10 may improve the accuracy the select portion of the input value used to pre-fill input field 20.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

The invention claimed is:

1. A method comprising:
   maintaining, by a computing device, a group of associations between input field identifiers and identifiers of a plurality of data repositories, wherein the group of associations comprises at least one association between an input field identifier of an input field and an identifier of a data repository of the plurality of data repositories;
   receiving, by the computing device operatively coupled to a presence-sensitive screen, an indication that the input field, displayed at the presence-sensitive screen, has been accessed, wherein the indication comprises the input field identifier that is associated with the input field and that describes a characteristic of an input value that is receivable at the input field;
   in response to receiving the indication and querying the group of associations, selecting, from the plurality of data repositories, and based on the at least one association between the input field identifier of the input field and the identifier of the data repository, the data repository, wherein the data repository includes first heuristic data in a plurality of heuristic data usable to generate at least a portion of the input value, wherein the input field identifier at least partially matches the identifier of the data repository;
   determining as second heuristic data in the plurality of heuristic data, by the computing device, geographic coordinates of the computing device, wherein the geographic coordinates indicate a geographic location of the computing device;
   determining as third heuristic data in the plurality of heuristic data, by the computing device and based on the geographic coordinates, a plurality of named locations included in a directory service; and
   generating, by the computing device, at least the portion of the input value based at least in part on the plurality of heuristic data and a distance between the geographic location of the computing device and at least one of the plurality of named locations, wherein at least the portion of the input value is assigned to the input field displayed at the presence-sensitive screen.

2. The method of claim 1, further comprising:
   displaying, at the presence-sensitive screen, the input field that is capable of receiving at least the portion of the input value.

3. The method of claim 1,
   wherein at least the portion of the input value comprises a first portion, and
   wherein the input value further comprises a second portion.

4. The method of claim 3, further comprising:
   displaying, at the presence-sensitive screen, the input field; and assigning, by the computing device, the first portion of the input value to the input field for display before receiving the second portion of the input value in the input field.

5. The method of claim 3, wherein generating the first portion of the input value based at least in part on the plurality of heuristic data further comprises:
generating, by the computing device, a statistic value based on one or more properties of at least a portion of the plurality of heuristic data; and
determining, by the computing device, that the first portion of the input value is based on the statistic value.

6. The method of claim 5, wherein generating the statistic value based on at least the portion of the plurality of heuristic data further comprises:
selecting, by the computing device, a most frequently occurring value of one or more values of at least the portion of the plurality of heuristic data, wherein the most frequently occurring value comprises a value with a highest number of occurrences among the one or more values; and
determining, by the computing device, that the first portion of the input value comprises the most frequently occurring value.

7. The method of claim 5, wherein generating the statistic based on at least the portion of the plurality of heuristic data comprises:
selecting, by the computing device, a group of recent values of one or more values of at least the portion of the plurality of heuristic data, wherein the group of recent values have occurred within a specified time interval;
determining, by the computing device, a most frequently occurring value of the group of recent values, wherein the most frequently occurring value comprises a recent value with a highest number of occurrences among the group of recent values; and
determining, by the computing device, that the first portion of the input value comprises the most frequently occurring value.

8. The method of claim 3, further comprising:
receiving, by the computing device, geographic coordinates of the computing device, wherein the geographic coordinates indicate a geographic location of the computing device;
selecting, by the computing device, a subset of at least the portion of the plurality of heuristic data based on the geographic coordinates; and
generating, by the computing device, the first portion of the input value based on the subset of at least the portion of the heuristic data.

9. The method of claim 3, further comprising:
generating, by the computing device, a group of candidate portions of the input value based on one or more properties of at least the portion of the plurality of heuristic data, wherein each candidate portion comprises a value selectable by a user as the first portion of the input value;
displaying, by the presence-sensitive screen, the group of candidate portions of the input value;
receiving, by the computing device, selection data from a user that indicates a candidate portion has been selected; and
determining, by the computing device, the selected candidate portion comprises the first portion of the input value.

10. The method of claim 3, further comprising,
displaying, by the presence-sensitive screen, the assigned first portion of the input value to the input field.

11. The method of claim 3, wherein the first portion of the input value is not generated responsive to the second portion of the input value entered by a user.

12. The method of claim 3, wherein the first portion of the input value comprises a complete input value.

13. The method of claim 3, wherein the first portion of the input value comprises a prefix or a suffix of the input value.

14. The method of claim 1, further comprising:
selecting, by the computing device, an association between the input field identifier and the data repository, wherein the association further indicates a subset of at least a portion of the plurality of heuristic data; and
selecting, by the computing device, the subset of at least a portion of the plurality of heuristic data from the data repository.

15. The method of claim 1, further comprising:
generating, by the computing device, a request that identifies a remote data repository storing remote heuristic data on a remote device;
sending, by the computing device, the request to the remote device; and
receiving, by the computing device, the remote heuristic data.

16. The method of claim 1, wherein the computing device stores at least a portion of the plurality of heuristic data in the data repository.

17. The method of claim 16, wherein the data repository comprises a call log, and wherein the call log comprises a group of telephone numbers called by the computing device.

18. The method of claim 16, wherein the data repository comprises a call log, and wherein the call log comprises a group of telephone numbers received by the computing device.

19. The method of claim 1, wherein the input value comprises a telephone number or country name.

20. A non-transitory computer-readable storage medium encoded with instructions that, when executed by one or more processors of a computing device, cause the one or more processors to perform operations comprising:
maintaining a group of associations between input field identifiers and identifiers of a plurality of data repositories, wherein the group of associations comprises at least one association between an input field identifier of an input field and an identifier of a data repository of the plurality of data repositories;
receiving, by the computing device operatively coupled to a presence-sensitive screen, an indication that the input field, displayed at the presence-sensitive screen, has been accessed, wherein the indication comprises the input field identifier that is associated with the input field and that describes a characteristic of an input value that is receivable by the input field;
in response to receiving the indication and querying the group of associations, selecting, from the plurality of data repositories, and based on the at least one association between the input field identifier of the input field and the identifier of the data repository, the data repository, wherein the data repository includes first heuristic data in a plurality of heuristic data usable to generate at least a portion of the input value, wherein the input field identifier at least partially matches the identifier of the data repository;
determine as second heuristic data in the plurality of heuristic data, by the computing device, geographic coordinates of the computing device, wherein the geographic coordinates indicate a geographic location of the computing device;

determine as third heuristic data in the plurality of heuristic data, by the computing device and based on the geographic coordinates, a plurality of named locations included in a directory service; and generating at least the portion of the input value based at least in part on the plurality of heuristic data and a distance between the geographic location of the computing device and at least one of the plurality of named locations, wherein at least the portion of the input value is assigned to the input field displayed at the presence-sensitive screen.

21. A computing device, comprising:

one or more processors; and a presence-sensitive screen, wherein the one or more processors are configured to:

maintain a group of associations between input field identifiers and identifiers of a plurality of data repositories, wherein the group of associations comprises at least one association between an input field identifier of an input field and an identifier of a data repository of the plurality of data repositories;

receive an indication that the input field, displayed at the presence-sensitive screen, has been accessed, wherein the indication comprises the input field identifier that is associated with the input field and that describes a characteristic of an input value that is receivable by the input field;

in response to receiving the indication and querying the group of associations, selecting from the plurality of data repositories, and based on the at least one association between the input field identifier of the input field and the identifier of the data repository, the data repository, wherein the data repository includes first heuristic data in a plurality of heuristic data usable to generate at least a portion of the input value, wherein the input field identifier at least partially matches the identifier of the data repository;

determine as second heuristic data in the plurality of heuristic data geographic coordinates of the computing device, wherein the geographic coordinates indicate a geographic location of the computing device;

determine as third heuristic data in the plurality of heuristic data, based on the geographic coordinates, a plurality of named locations included in a directory service; and     generate at least the portion of the input value based at least in part on the plurality of heuristic data and a distance between the geographic location of the computing device and at least one of the plurality of named locations, wherein at least the portion of the input value is assigned to the input field displayed at the presence-sensitive screen.

* * * * *